(No Model.)

A. P. WOODS.
GREEN CORN CUTTER.

No. 249,441. Patented Nov. 8, 1881.

WITNESSES.

INVENTOR
A. P. Woods.
By
ATTORNEY.

UNITED STATES PATENT OFFICE.

ALEXANDER P. WOODS, OF BALTIMORE, MARYLAND.

GREEN-CORN CUTTER.

SPECIFICATION forming part of Letters Patent No. 249,441, dated November 8, 1881.

Application filed September 28, 1881. (No model.)

*To all whom it may concern:*

Be it known that I, ALEXANDER P. WOODS, of Batimore city, State of Maryland, have invented certain new and useful Improvements in Green-Corn Cutters; and I hereby declare the same to be fully, clearly, and exactly described as follows, reference being had to the accompanying drawings, in which—

Figure 1:
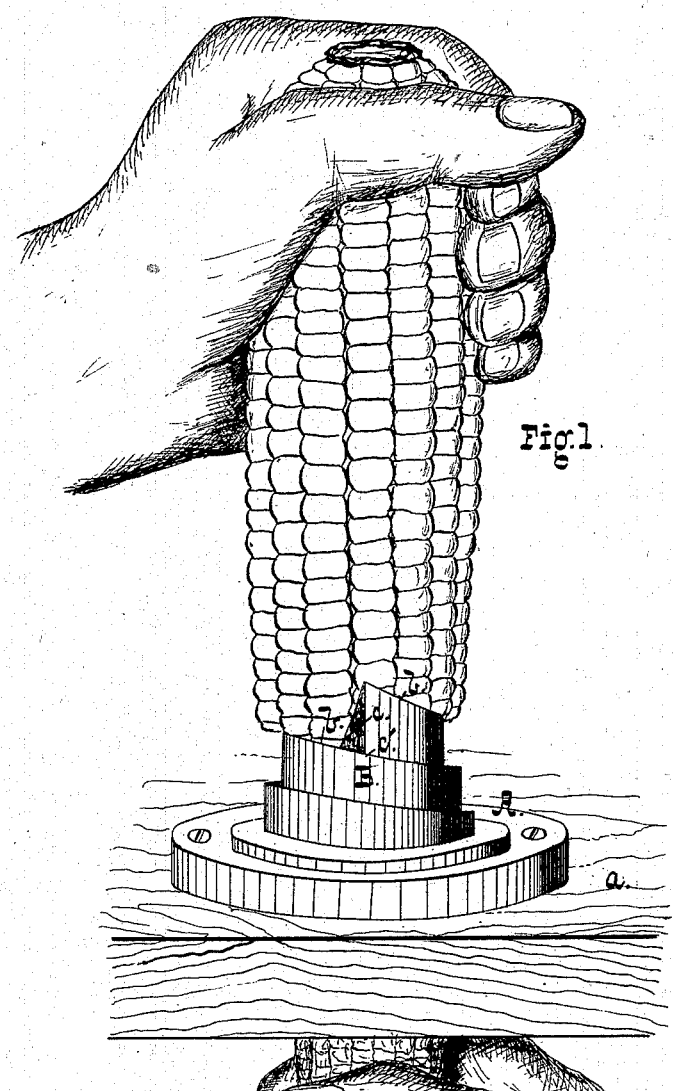
Figure 2:
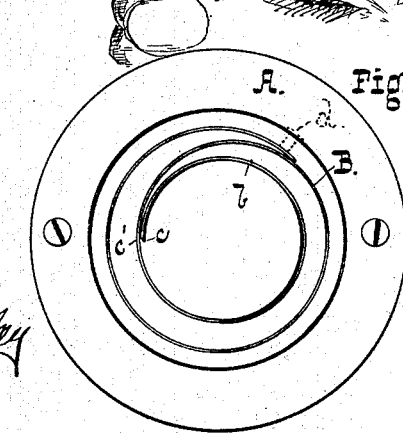

Figure 1 is a perspective view illustrating the device and mode of using the same, and Fig. 2 is a plan of the device.

My invention relates to apparatus for cutting the kernels of green corn from the cob; and it has for its object to provide a device of that class adapted to gage itself to ears differing greatly in size, and produce a uniform cut.

Heretofore in apparatus of this class the knives were liable, in operating upon small ears of corn, to merely cut off the tops of the kernels, leaving the greater and better portion of them on the cob, and in cutting the kernels from large ears to remove with them a considerable portion of the substance of the cob.

In the device about to be described a continuous knife embraces the ear, and is adapted, from the contour of the cutting-edge, to close upon the cob as the ear is passed within the circle of the knife, while being so arranged that the inward gripe of the knife may be quickly and readily relaxed, so as to make a proper cut should the particular ear which is being treated have a quick taper. In a word, the natural tendency of the knife is to close upon the cob; but this tendency is completely under control, and may be instantly lessened or augmented, as may be necessary or desirable.

In the drawings, A is a base or casting secured to a suitable support, *a*, and B is the knife. The latter is made of spring steel, and is in the form of a volute or spiral, the cutting-edge *b* having a gradual pitch from the inner to the outer coil, the lower edges of the coils lying in the same plane. Unrolled the knife would have the shape of a right-angled triangle the hypotenuse being the cutting-edge, and the blank is rolled up parallel to the longer of its other two sides. The inner coil is nearly a true circle, the vertical edge *c* being almost or quite in contact with the part *c'*, and the other end is riveted or attached to the base A at *d*.

The base is centrally perforated for the passage of the cob.

In operation the cob is inserted small end first in the coil of the knife, and is pressed down, as shown. The shearing cut afforded by the inclined edge of the knife severs the kernels evenly and sharply without squeezing them, and causing the juice and milk to exude to the extent caused by those cutters which scrape the kernels, as it were, from the cob, and at the same time it causes the knife to clasp the cob closely. If the cob have a quick taper, this clasping action would be excessive and would cause the knife to cut too deeply; but in that case the resistance to the downward motion of the cob instantly increases and is perceived by the operator, who by slightly turning the cob expands the knife to the proper point. So delicate is the working of the knife in this respect that its cut is perfectly uniform, even in the hands of an inexperienced operator. As soon as the point of the cob appears below, it is seized by the other hand of the operator, and the cob is pulled through.

In order to prevent the inner coils of the knife from being bodily depressed within the outer ones by the force imposed upon the ear, I may either stiffen the blade sufficiently to prevent such depression without materially impairing the expansibility of the cutting-coil, or, if great delicacy of expansibility is desired, a pin may be riveted to the inner coil, which pin plays in a slot cut horizontally in the other or others, or the entire blade may have a horizontal corrugation, the convexity of one coil registering with the concavity of the next.

Again, instead of passing the ear downward through the blade the motion may be reversed; but the described construction is to be preferred.

In point of cheapness, simplicity, and efficiency the device leaves nothing to be desired. It does its work rapidly and well, and skilled labor is not necessary to operate it.

What I claim is—

1. In a green-corn cutter, a volute continuous knife adapted to clasp the cob, as and for the purpose set forth.

2. In a green-corn cutter, a volute continuous knife having its cutting-edge pitched from